Oct. 14, 1952 J. R. STANFIELD 2,613,987
MEANS FOR RAISING AND LOWERING TOPS OF MOTOR VEHICLES
Filed May 31, 1949 2 SHEETS—SHEET 2

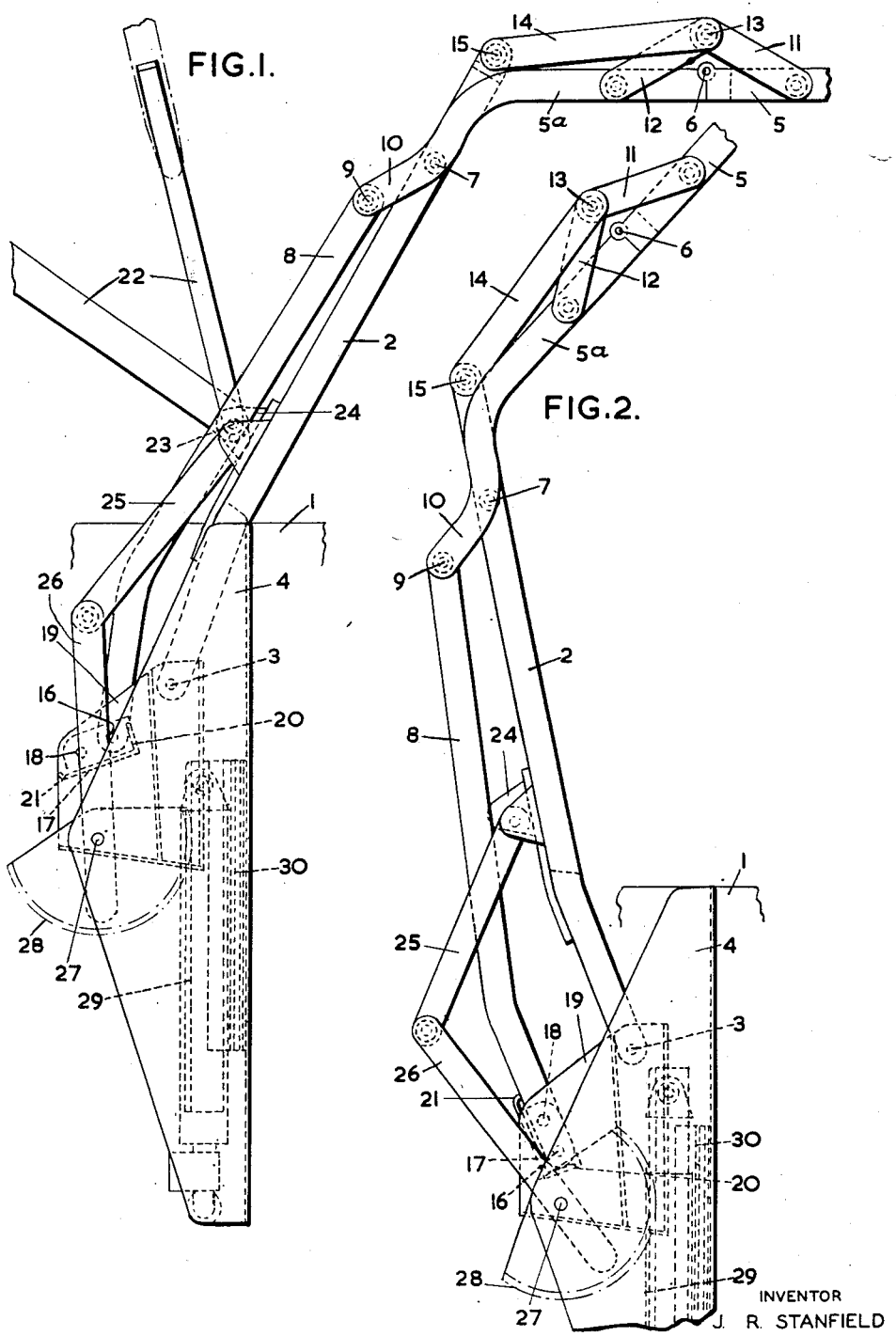

INVENTOR
J. R. STANFIELD

BY *Hyatt Dowell*
ATTORNEY

Patented Oct. 14, 1952

2,613,987

UNITED STATES PATENT OFFICE 2,613,987

MEANS FOR RAISING AND LOWERING TOPS OF MOTOR VEHICLES

James R. Stanfield, Castle Bromwich, Birmingham, England, assignor to The Austin Motor Company Limited, Birmingham, England Application May 31, 1949, Serial No. 96,259
In Great Britain June 16, 1948

3 Claims. (Cl. 296—117)

This invention relates to means for raising and lowering tops of motor vehicles and of the type comprising, at each side of the vehicle, a main pillar pivoted at its lower end to a fixed part of the vehicle and having pivotally connected to it, near its upper end, a forwardly extending cant rail which supports the forward part of the respective side of the hood, said cant rail having, at a location forwardly of the main pillar, a knuckle joint arranged to break downwardly to permit the forward part of the cant rail to fold back in relation to the rearward part as the hood is being lowered or collapsed.

The breaking of the knuckle joint has been effected by a control link located closely behind the main pillar and disposed substantially parallel thereto, when the top is set up, the control link being pivoted at the lower end to a fixed part of the vehicle and at its upper end to a downwardly and rearwardly extending extension of the cant rail past its pivotal connection to the main pillar. Hence, as the main pillar moves back, the control link raises the said cant rail extension so as to cause the knuckle joint to break downwardly.

The main pillar is raised and lowered by hydraulic means which, during the first part of the lowering movement, has to act through disadvantageous leverage and it has to supply force to lift the cant rail from the horizontal position in addition to that required to break the knuckle joint downwardly.

In a top raising and lowering means of the type referred to and according to the present invention, the knuckle joint is not broken down during the first part of the rearward movement of the main pillar, provision being made for delaying the breaking of the knuckle joint until the cant rail has been raised into a position in which its weight becomes wholly or partially balanced and where the hydraulic means acts on the main pillar through a more advantageous leverage and, consequently, is better able to supply the force needed to break down the knuckle joint.

In order to effect the delay in breaking down the knuckle joint, the lower end of the control link is arranged to be free to move down during the first part of the rearward movement of the main pillar, so that the upper end of the control link does not exert upward pressure on the rearward extension of the cant rail until the downward movement of the control link is arrested by a stop, after which it acts to break down the knuckle joint in the known manner.

The invention will now be more fully described by way the embodiment, shown by way of example, in the accompanying drawing in which:

Figs. 1, 2 and 3 are side elevations of the top lowering and raising means and show the parts in the fully raised, partially folded and fully folded positions respectively.

Figure 3:
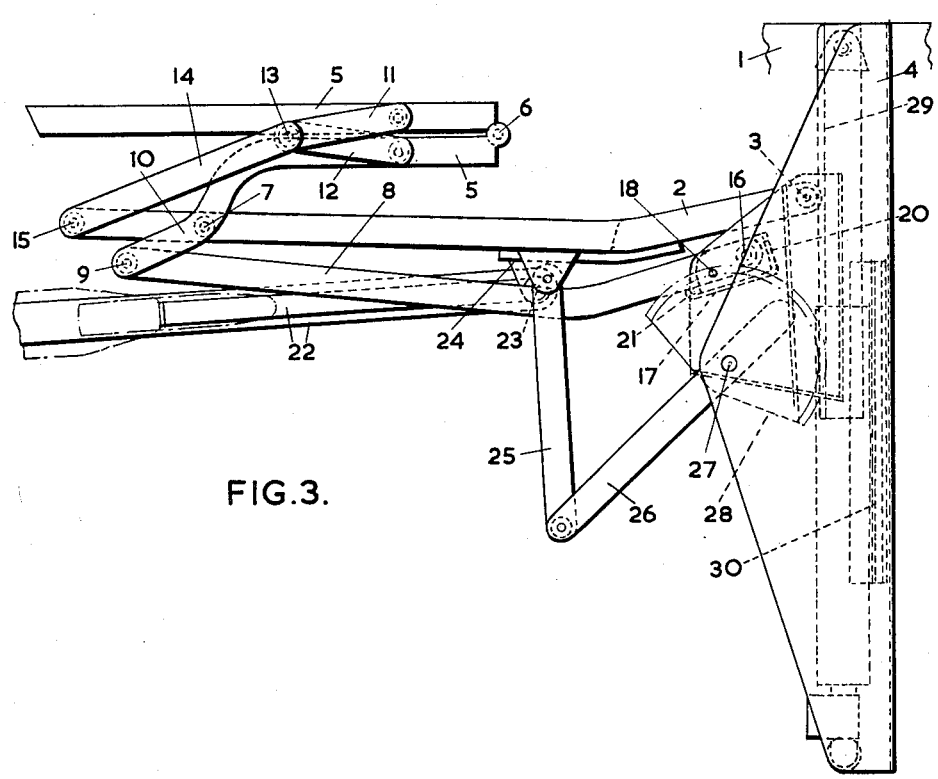

Referring to the drawings and more particularly to Figs. 1 2 and 3, the top raising and lowering means at each side of the vehicle body 1 comprises a main pillar 2 having its lower end pivoted at 3 to the upper part of a mounting bracket 4 which is fixed to the side of the vehicle body. A cant rail, comprising the two parts 5, 5a connected by a knuckle joint 6, is pivoted at 7 to the main pillar 2 near its upper end. The cant rail when in its forwardly extended position shown in Fig. 1 supports the forward part of the respective side of the top (not shown), and the knuckle joint 6 is arranged to break downwardly to permit the forward part 5 of the cant rail to fold back in relation to the rear part 5a as the top is being lowered. The breaking of the knuckle joint is effected by a main control link 8 located closely behind the main pillar 2 and disposed substantially parallel thereto when the hood is set-up (see Fig. 1), the main control link being connected by a pivot 9 at its upper end to an extension 10 of the cant rail part 5a which projects rearwardly and downwardly beyond the pivot 7, whilst the movement of the cant rail part 5 relatively to the part 5a is controlled by links 11, 12 respectively pivoted to the parts 5, 5a and having a common pivotal connection 13 with the forward end of a link 14 which, at its opposite end, is connected to a pivot 15 at the upper end of the main pillar 2.

Figure 4:
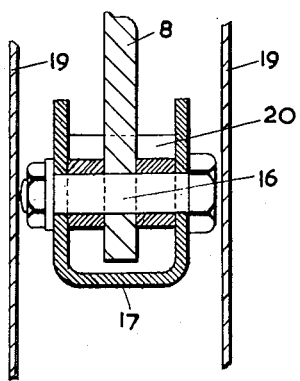
Fig. 4 is a fragmentary sectional view showing the pivotal connection of the lower end of the control link with a lost-motion link.
Figure 5:
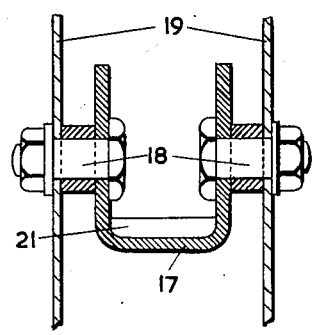
Fig. 5 is a fragmentary sectional view the section being taken through the trunnion mounting of said lost-motion link.

The lower end of the main control link 8, instead of being connected directly to a fixed pivot as heretofore, is pivoted at 16 to the forward end of a lost-motion link 17 which is mounted at its rear end to swing about trunnions 18 between the sides of a U-shaped bracket 19. As shown in Figs. 4 and 5 the lost-motion link 17 is of channel cross-section and has a front end wall 20 and a lip 21 turned up from the face of the channel at its rear end.

The usual hoop sticks 22 which support the rear part of the folding top are pivotally mounted on a stud 23 carried by a bracket 24 in the main pillar 2.

For operating the main pillar 2 it is connected by a link 25 to the upper end of lever 26 which is turned about an axis 27 by a toothed quadrant 28 meshing with a toothed rack 29 which is guided for vertical movement in fixed guides 30 and is hydraulically operated, the said guides 30 being mounted in the U-shaped bracket 4 fixed to the vehicle body.

When the top is set-up, as shown in Fig. 1, the lost-motion link 17 is in a substantially horizontal position with the upper edge of its end wall 20 engaging the forward side of control link 8.

As the toothed rack 29 is raised in its guides 30, the toothed quadrant 28 and the associated lever 26 are turned anti-clockwise (as seen in Fig. 2) so as to cause the link 25 to swing the main pillar 2 rearwardly from the position shown in Fig. 1 to the other extreme position shown in Fig. 3 in which the top is fully collapsed or folded. During the initial part of this collapsing movement the knuckle joint 6 is not broken, since in moving from the position shown in Fig. 1 to that shown in Fig. 2, the control link 8 cannot exert any upward pressure on the rearward extension 10 of the cant rail part 5a, the lower end of the control link 8 moving down under the control of the lost-motion link 17 until the latter occupies an almost vertical position with its lip 21 engaging the rear side of the control link 8 (see Fig. 2).

During the remainder of the rearward swinging movement of the main pillar 2, that is in moving from the position shown in Fig. 2 to that shown in Fig. 3, the lost-motion link 17 and the control link 8 turn together anti-clockwise as a single member about the trunnions 18 until finally the lost-motion link 17 reassumes the substantially horizontal position it occupied in Fig. 1 (see Fig. 3). Thus the trunnions 18 serve virtually as a fixed pivot about which the control link 8 is caused to turn during the latter portion of the hood collapsing movement so as to break the knuckle joint 6 in known manner.

It will be seen, therefore, that during the folding down or rearward collapsing movement of the top the breaking down of the knuckle joint 6 is delayed, by the action of the lost-motion link 17, until the cant rail has been lifted and moved backwardly to a position where its weight becomes partly or wholly balanced and where the hydraulic means acts on the main pillar through a more advantageous leverage, and, consequently, is better able to supply the force necessary to break down the knuckle joint.

During the initial part of the return movement to erect the top, the knuckle joint 6 remains closed and the control link 8 moves with the main pillar 2 so as to swing the lost-motion link 17 upwardly until the forward side of the control link 8 engages the confronting edge of the end wall 20 of the lost-motion link 17. During the remainder or final part of the erecting movement the control link 8 pushes the lost-motion link 17 forwardly and downwardly into a substantially horizontal position and, in doing so, the lower end of the control link 8 is constrained to follow the arcuate path of the pivot 16 so as to cause the knuckle joint 6 to be remade and the cant rail to straighten.

Having fully described my invention, what I claim and desire to secure by Letters Patent is:

1. Vehicle top raising and lowering means and comprising at each side of the vehicle a main pillar pivoted at its lower end to a fixed part of the vehicle, a forwardly extending cant rail pivoted to the main pillar near its upper end and having a rearward extension beyond the pivot, said cant rail being in two parts interconnected by a knuckle joint adapted to break downwardly, operating means acting on the main pillar to move it rearwardly to lower the top and forwardly to raise the top, a control link connected to the rearward extension of the cant rail to effect the breaking of said knuckle joint during the lowering of the top and the making of said joint during the raising of said top, and lost-motion linkage means interconnecting a fixed part of the vehicle and said control link to delay the breaking of the knuckle joint until the cant rail has been raised into a position where its weight is more nearly balanced and where the operating means acts through a more advantageous leverage to break down the knuckle joint.

2. Vehicle top raising and lowering means and comprising at each side of the vehicle a main pillar pivoted at its lower end to a fixed part of the vehicle, a forwardly extending cant rail pivoted to the main pillar near its upper end and having a rearward extension beyond the pivot, said cant rail being in two parts interconnected by a knuckle joint adapted to break downwardly, operating means acting on the main pillar to move it rearwardly to lower the top and forwardly to raise the top, a control link connected to the rearward extension of the cant rail to effect the breaking of said knuckle joint during the lowering of the top and the making of said joint during the raising of said top and a lost-motion link pivotally connected to the lower end of said control link mounted to swing about a fixed pivotal axis and which occupies a substantially horizontal position when the top is erected said lost-motion link having abutments which determine the extent of relative angular movement of the control link and lost-motion link about their common pivotal connection.

3. Vehicle top raising and lowering means and comprising at each side of the vehicle a main pillar pivoted at its lower end to a fixed part of the vehicle, a forwardly extending cant rail pivoted to the main pillar near its upper end and having a rearward extension beyond the pivot, said cant rail being in two parts interconnected by a knuckle joint adapted to break downwardly, operating means acting on the main pillar to move it rearwardly to lower the top and forwardly to raise the top, a control link connected to the rearward extension of the cant rail to effect the breaking of said knuckle joint during the lowering of the top and the making of said joint during the raising of said top, and a lost-motion link of channel section mounted to swing about a fixed pivotal axis at one end and pivotally connected at its other end to the lower end of the control link, the ends of the lost-motion link being provided with abutments for engaging the forward and rear sides of the control link respectively so as to determine the range of relative angular movement of the control link and lost-motion link about their common pivotal connection.

JAMES R. STANFIELD.

REFERENCES CITED

The following references are of record in the file of this patent:

UNITED STATES PATENTS

| Number | Name | Date |
|---|---|---|
| 1,186,337 | Roush | June 6, 1916 |
| 1,230,110 | Byron | June 19, 1917 |
| 1,952,252 | Heuser | Mar. 27, 1934 |

FOREIGN PATENTS

| Number | Country | Date |
|---|---|---|
| 4,304 | Great Britain | Feb. 19, 1914 |
| 474,769 | France | Mar. 12, 1915 |